United States Patent
Dickie

(10) Patent No.: US 6,577,081 B2
(45) Date of Patent: *Jun. 10, 2003

(54) SAFETY SHIELD ASSEMBLY FOR ELECTRICAL APPARATUS

(75) Inventor: Robert G. Dickie, Newmarket (CA)

(73) Assignee: Elumina Lighting Technologies, Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/910,922

(22) Filed: Jul. 24, 2001

(65) Prior Publication Data

US 2002/0017880 A1 Feb. 14, 2002

Related U.S. Application Data

(63) Continuation-in-part of application No. 09/414,947, filed on Oct. 8, 1999, now Pat. No. 6,337,541.

(51) Int. Cl.[7] .............................................. H05B 41/00
(52) U.S. Cl. ...................... 315/363; 439/135; 439/137; 439/149; 439/375
(58) Field of Search ..................... 315/363; 439/375, 439/544, 550, 552, 597, 598, 599, 135, 136, 137, 138, 139, 140, 141, 142, 149

(56) References Cited

U.S. PATENT DOCUMENTS

| | | | |
|---|---|---|---|
| 3,888,583 A | 6/1975 | Kiefer et al. ................ 355/71 |
| 3,968,355 A | 7/1976 | Smallegan ................ 240/2 R |
| 4,135,116 A | 1/1979 | Smith .................... 315/158 |
| 4,182,977 A | 1/1980 | Stricklin, Jr. ............. 315/158 |
| 4,467,246 A | 8/1984 | Tanaka et al. ............. 315/362 |
| 4,494,815 A | * 1/1985 | Brzostek et al. ............ 339/123 |
| 4,593,234 A | 6/1986 | Yang .................... 315/200 R |
| 4,792,729 A | 12/1988 | Peters .................... 250/205 |
| 4,886,961 A | 12/1989 | Kimura et al. ............. 439/692 |
| 5,083,946 A | 1/1992 | Chester, Jr. .............. 315/151 |
| 5,089,748 A | 2/1992 | Ihms .................... 315/169.3 |
| 5,336,978 A | 8/1994 | Alessio .................. 315/158 |
| 5,357,170 A | 10/1994 | Luchaco et al. ........... 315/158 |
| 5,361,017 A | 11/1994 | Krause .................. 315/151 |
| 5,406,173 A | 4/1995 | Mix et al. ................. 315/156 |
| 5,446,343 A | 8/1995 | Shulman ................. 315/156 |
| 5,493,183 A | 2/1996 | Kimball ................. 315/308 |
| 5,537,003 A | 7/1996 | Bechtel et al. ............. 315/82 |
| 5,572,817 A | 11/1996 | Chien .................... 40/544 |
| 5,670,776 A | 9/1997 | Rothbaum ............. 250/214 AL |
| 5,779,346 A | 7/1998 | Burke .................... 362/821 |
| 5,888,090 A | 3/1999 | Achee .................... 439/417 |
| 5,975,938 A | 11/1999 | Libby .................... 439/410 |

FOREIGN PATENT DOCUMENTS

| EP | 0 470 866 | 2/1992 |
|---|---|---|
| WO | WO 99 40559 | 8/1999 |

* cited by examiner

Primary Examiner—Don Wong
Assistant Examiner—Thuy Vinh Tran
(74) Attorney, Agent, or Firm—Sterne, Kessler, Goldstein & Fox P.L.L.C.

(57) ABSTRACT

A safety shield assembly for an electrical apparatus comprises a bellows which is recessed into the planar surface of the apparatus which surrounds a pair of electrical blades, and which faces the planar face of a wall receptacle when the electrical apparatus is plugged into the receptacle. The safety shield assembly includes the bellows and a cavity into which the bellows is secured. In its uncompressed state, the bellows extends nearly the length of the electrical blades; in its compressed state, the bellows recedes fully into the cavity.

23 Claims, 17 Drawing Sheets

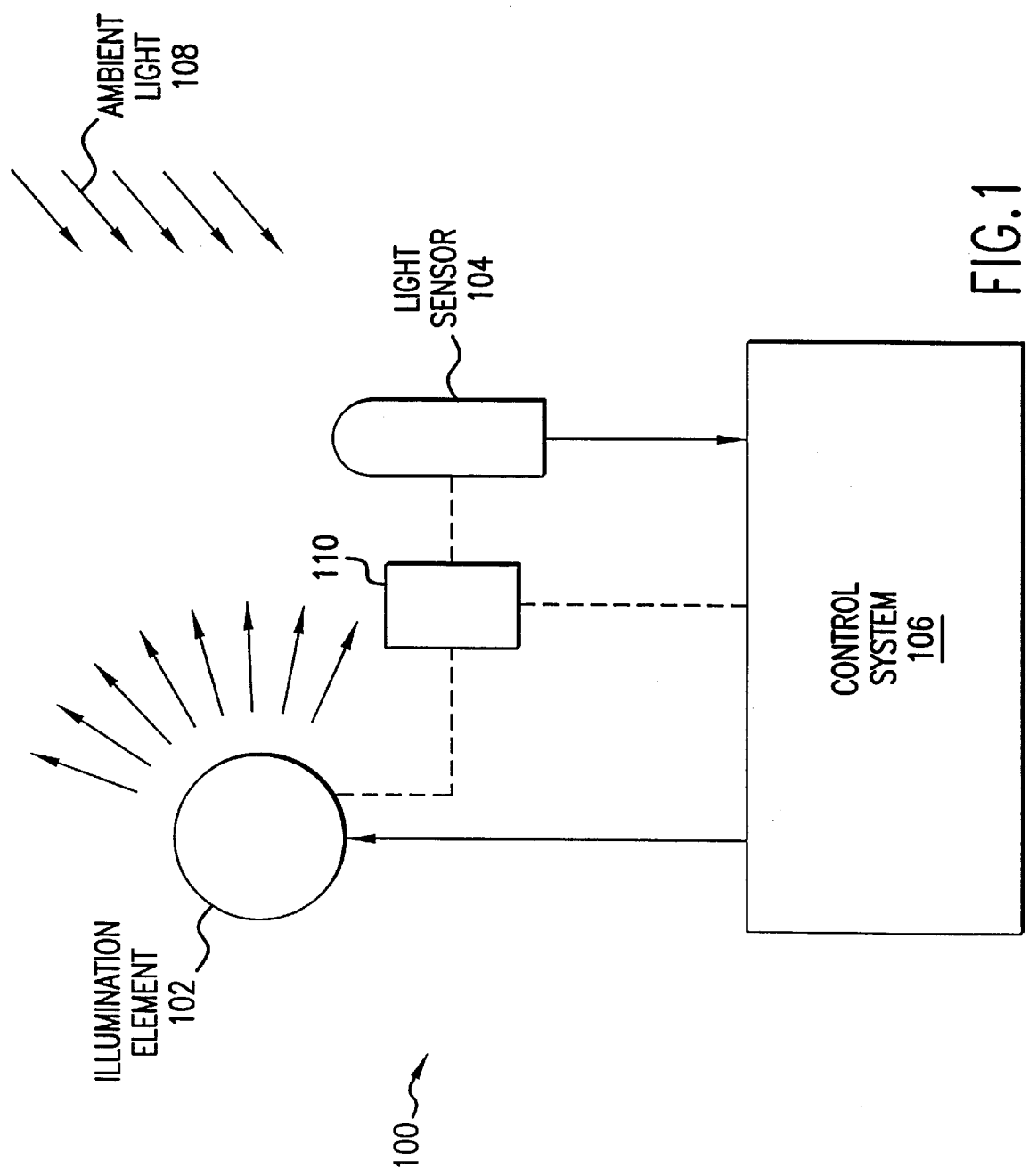

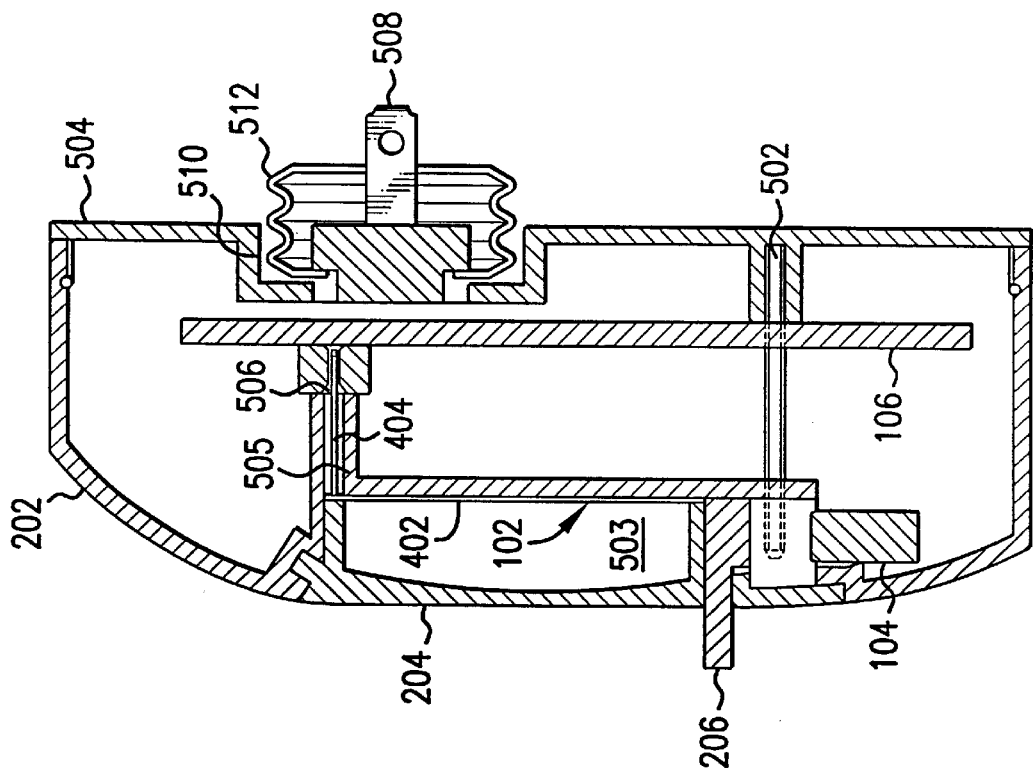
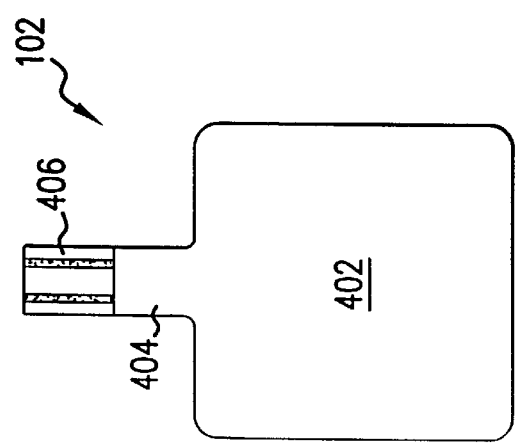

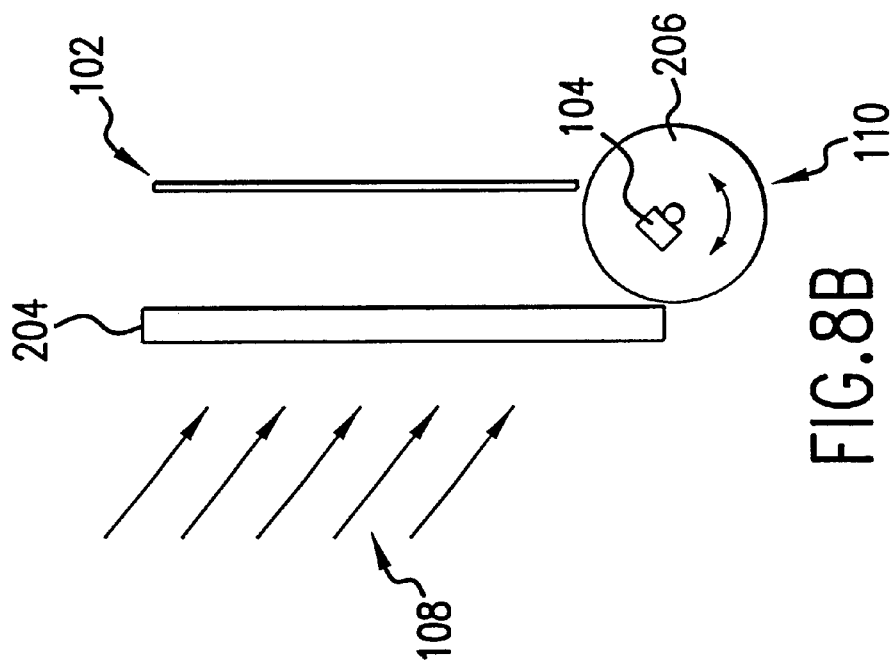
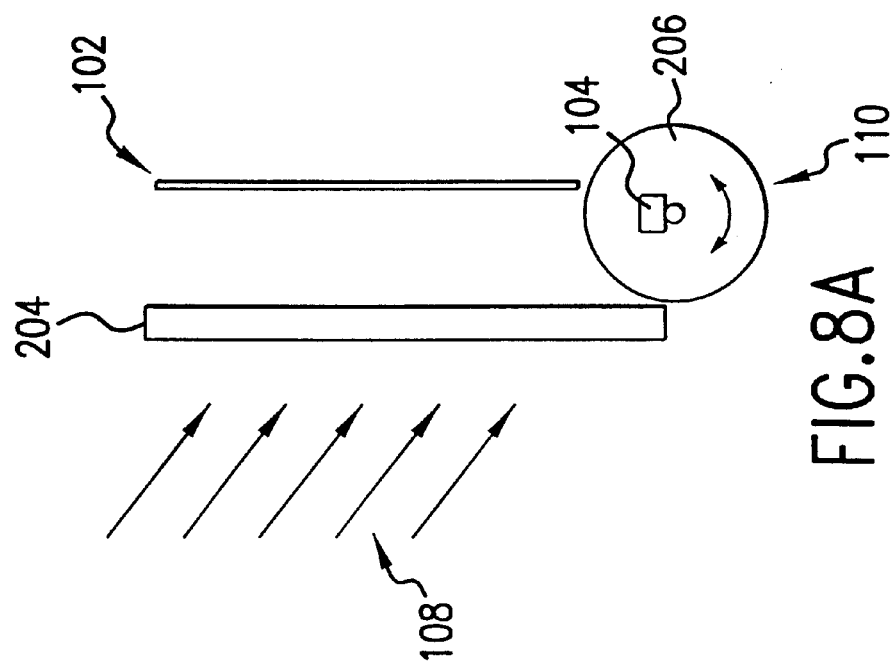

SAFETY SHIELD ASSEMBLY FOR ELECTRICAL APPARATUS

CROSS-REFERENCE TO RELATED APPLICATIONS

The present application is a continuation-in-part of U.S. application Ser. No. 09/414,947, filed Oct. 8, 1999, which is, now U.S. Pat. No. 6,337,541, incorporated in its entirety by reference herein.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (submitted on a compact disc and an incorporation-by-reference of the material on the compact disc)

Not applicable.

BACKGROUND OF THE INVENTION

1. Field of the Invention

The present invention relates to safety shields, and particularly safety shield assemblies that may be employed with electrical apparatuses which plug directly into a wall receptacle. The purpose of the safety shield assembly is to preclude the chance of the fingers, particulars the fingers of an infant, contacting the electrical blades while they are still received in mating electrical sockets, and therefore have household voltage imposed between the electrical blades.

2. Related Art

There is a growing cause for concern for the safety of infants and young children. Particularly, the concern is for children who have not yet reached the age at which they may be reasoned with and instructed as to the dangers of household electricity. Such children may typically range in age from that of a toddler who may yet only be crawling—typically, 7 to 15 months of age—up to pre-school aged children who have yet to learn discipline, or have yet to reach the age at which they may be spoken to about the dangers of certain actions which they might undertake.

Almost any home where any such children live or are expected to visit, will possibly have covers placed over any unused wall receptacles so as to preclude prying fingers from entering into the wall receptacles and thereby receiving an electrical shock. Moreover, many small children have a tendency to want to stick small toys, or parts of toys, into wall receptacles. All such actions are, of course, fraught with danger.

A particular danger exists in children's bedrooms, where they may stay for many hours in a relatively unsupervised condition. This is not to say that such children are not monitored; indeed, the present invention finds particular usefulness in association with wall-mounted transformers that are used for monitor transmitters which are placed in an infant's bedroom. Such monitor transmitters are electrically powered, and typically include at least a microphone, so that they transmit any sounds that the infant will make to a receiver which is placed in another room. That other room may, of course, be the kitchen, living room, the parent's bedroom, or the like, often within a range of 5 to 30 meters away from the monitor in the infant's bedroom.

The manufacturers of such monitors have gone to great lengths to assure that the operation of the monitor is safe. That is, they have gone to great lengths to ensure that the monitor operates at a low voltage and is rugged so that, if dropped, it is not likely to break. Even so, additional precautions are taken so that, in any event, the voltage at which the monitor operates is less than 25 volts—typically, 3 to 12 volts.

However, in order to achieve the low voltage power supply to the monitor, a wall-mounted transformer is required unless the monitor is battery-powered—which is very expensive to operate. Thus, there still exists a danger.

Specifically, particularly with children who are able to get into and out of bed on their own accord, but who still are not of an age where they understand the dangers of household electricity, such children have sufficient strength in their hands and arms to remove a wall-mounted transformer from the wall receptacle into which it has been plugged. However, because the co-operation between the electrical blades on the transformer and the electrical sockets into which the blades have been placed may be quite tight, there may be some considerable effort to withdraw the transformer away from the wall socket. Even adults find that some considerable effort may be required.

To get better leverage, the tendency is to place the fingers as close as possible to the source of resistance to motion. That is, the fingers may be wrapped around the edges of the wall-mounted transformer.

Thus, there is a risk that the fingers will contact the electrical blades as they are being withdrawn from the mating sockets of the wall receptacle. Until such time as the blades are nearly fully withdrawn from the wall receptacle, they remain "live". That is, household voltage—in North America, nominally 110 to 130 volts—is imposed across the electrical blades. If those electrical blades are contacted, there is a risk of electrical shock. If both are contacted, such as by inserting a finger between the electrical blades, then electrical shock is certain if the blades are still live.

The present invention applies to an electrical apparatus which plugs directly into a wall receptacle. The particular example discussed above is a wall-mounted transformer. However, any other kind of apparatus which plugs into a wall receptacle may also be applicable for employment of the safety shield assembly of the present invention. For example, in another embodiment presented below, a supplementary lighting device (such as a night light) is described. Supplementary lighting devices such as night lights are used throughout households, and particularly in children's bedrooms if they are afraid of darkness. Recently, electroluminescent supplementary lighting devices have become popular for their long life and cool light.

Other similar devices such as electric room air fresheners may include the safety shield assembly of the present invention. Further, even electrical plugs at the end of electrical cords for any electrical apparatus or device, or at the ends of extension cords, may be provided in the future having a planar face and a thickness sufficient to accommodate the safety shield assembly of the present invention, as described hereafter.

SUMMARY OF THE INVENTION

As can be seen from the description above, there exists a need for a safety apparatus to prevent electrical shock when removing or otherwise handling an electrical apparatus plugged into a wall receptacle. Therefore, in accordance with one aspect of the present invention, there is provided a safety shield assembly for an electrical apparatus which plugs directly into a wall receptacle, wherein the electrical apparatus has at least a pair of electrical blades for insertion into a pair of mating electrical sockets. The electrical apparatus includes a substantially planar face surrounding the electrical blades, from which substantially planar face the electrical blades extend outwardly.

The area of the substantially planar face of the electrical apparatus is sufficient to cover the region of a wall receptacle where the electrical sockets are placed.

Also, the region of the wall receptacle where the electrical sockets are placed is substantially planar, so as to be contiguous to the substantially planar face of the electrical apparatus when the electrical blades thereof are fully inserted into the mating electrical sockets.

The safety shield assembly may comprise a bellows-like structure having convoluted and compressible walls, and a recess or cavity in the substantially planar face of the electrical apparatus.

The bellows-like structure is made from an electrically insulative material, and is compressible along the walls thereof to a first, compressed height.

The bellows-like structure is preferably spaced away from and entirely surrounds the outwardly extending electrical blades.

Also, the recess or cavity is spaced away from and entirely surrounds the outwardly extending electrical blades, and has a depth which is at least as great as the first, compressed height of the bellows-like structure, and a width at least as great as the thickness of the walls of the bellows-like structure from the outside to the inside thereof, when the bellows-like structure is in its compressed state.

One end of the walls of the bellows-like structure is secured in the recess, so that the bellows-like structure extends outwardly therefrom.

The height of the walls of the bellows-like structure above the substantially planar face of the electrical apparatus, when the bellows-like structure is in its uncompressed state, is such that 50% to 100% of the length of the shortest of the at least two electrical blades is covered by the bellows-like structure.

The material of the bellows-like structure may be chosen from the group which consists of rubber, vinyl, polyvinylchloride, polyurethane, and mixtures, polymers, co-polymers, and derivatives thereof.

The bellows-like structure and the recess may each be rectangular or circular in shape. However, they might each also be other similar shapes, such as ellipses, squares, etc. Indeed, a common configuration of the bellows-like structure and the groove is that each is square.

Typically, the walls of the bellows-like structure are pleated, and comprise from 2 to 6 pairs of folds.

It is common for the uncompressed height of the walls of the bellows-like structure above the substantially planar face of the electrical apparatus to be in the range of 70% to 85% of the length of the shortest of the at least two electrical blades.

As discussed above, a typical electrical apparatus may be a wall-mounted transformer for transforming household voltage to below 25 volts or a supplementary lighting device such as a night light.

BRIEF DESCRIPTION OF THE FIGURES

The present invention is described with reference to the accompanying drawings, wherein:

FIG. 1 is a functional block diagram of a supplementary lighting device of the present invention;

FIG. 4 is an elevation view of an electroluminescent lighting element;

FIG. 5 is a cross-section of the supplementary lighting device of the present invention taken along lines 5—5 of FIG. 3A;

FIGS. 8A and 8B are cross-section views of an embodiment of a dimmer of the present invention;

DETAILED DESCRIPTION OF THE PREFERRED EMBODIMENTS

Figure 3A:
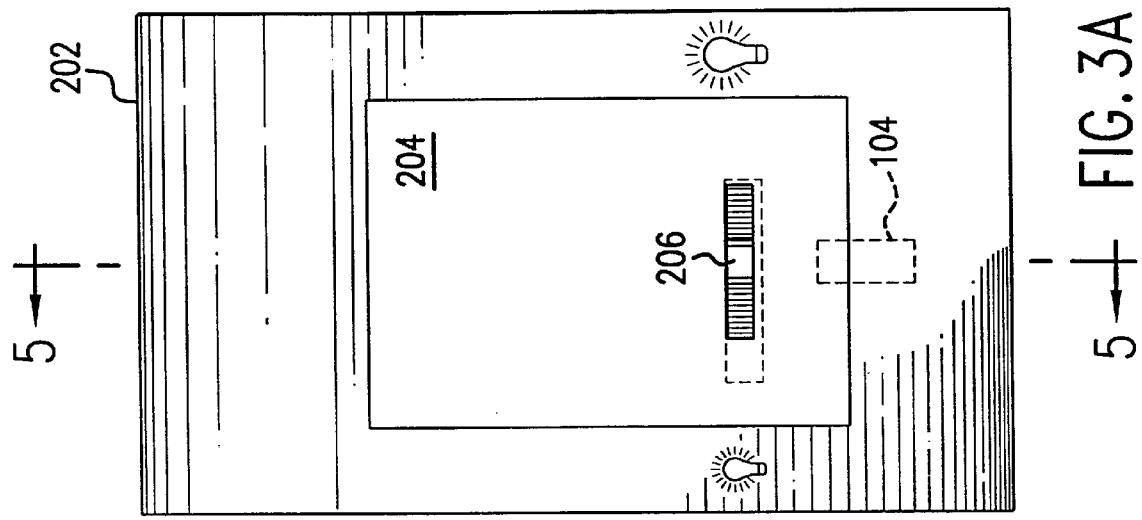
FIG. 3A is a front elevation view of a supplementary lighting device of the present invention.

Preferred embodiments of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

A preferred embodiment of a supplementary lighting device 100 is shown in block form in FIG. 1. FIG. 1 shows that device 100 includes an illumination element 102, light sensor 104, a control system 106 and a dimmer 110. Light sensor 104 and illumination element 102 are both coupled to control system 106. Control system 106 is preferably an electronic system which receives input from light sensor 104 and controls illumination element 102. Dimmer 110 is user controlled and varies the output intensity of illumination element 102 working in conjunction with light sensor 104, illumination element 102 and/or control system 106, as will be more fully explained below.

Illumination element 102 is an electroluminescent (EL) lighting element which will be described in more detail below. Light sensor 104 is preferably a light detecting resistor (LDR) and is disposed in device 100 so as to receive input both from illumination element 102 and any ambient light 108. Light sensor 104 can also be configured as two light sensors, one for detecting light emitted from illumination element 102 and one for detecting ambient light 108. Light sensor 104 can also be a photo-diode, photo-resistor, photo-transistor, or other similar devices which can detect light intensity.

Control system 106 is designed to generate an adjustable intensity of brightness of illumination element 102. A preferred method of generating an adjustable intensity of brightness uses a combination of an astable oscillating circuit and a voltage multiplying circuit. The frequency of the oscillator is controlled by a pre-set signal as well as input received from light sensor 104. In the example where light sensor 104 is an LDR, the resistance of the LDR is a function of the amount of light it receives. As the light intensity of ambient light 108 or illumination element 102 increases, the resistance of the LDR increases, thereby slowing the oscillator of control system 106. As the oscillator slows, the intensity of illumination element 102 decreases. As would be apparent to one skilled in the relevant art, depending on the pre-set levels of control system 106, illumination element 102 can be controlled such that when ambient light 108 is detected by light sensor 104 which is consistent with daylight or artificially lighted conditions, the oscillator is slowed such that illumination element 102 is turned "off."

It can be appreciated that because light sensor 104 also receives light emitting from illumination element 102, control system 106 acts as an intensity regulator to compensate for the decreased output of EL lighting elements due to ageing. Therefore, with a pre-set intensity for illumination element 102, as illumination element ages and its light intensity diminishes, light sensor 104 detects less light emitting from illumination element 102. This information is transmitted to control system 106, which increases the power to illumination element 102. This provides an automatic intensity regulation feature which compensates for the effects of ageing in illumination element 102.

Figure 2:
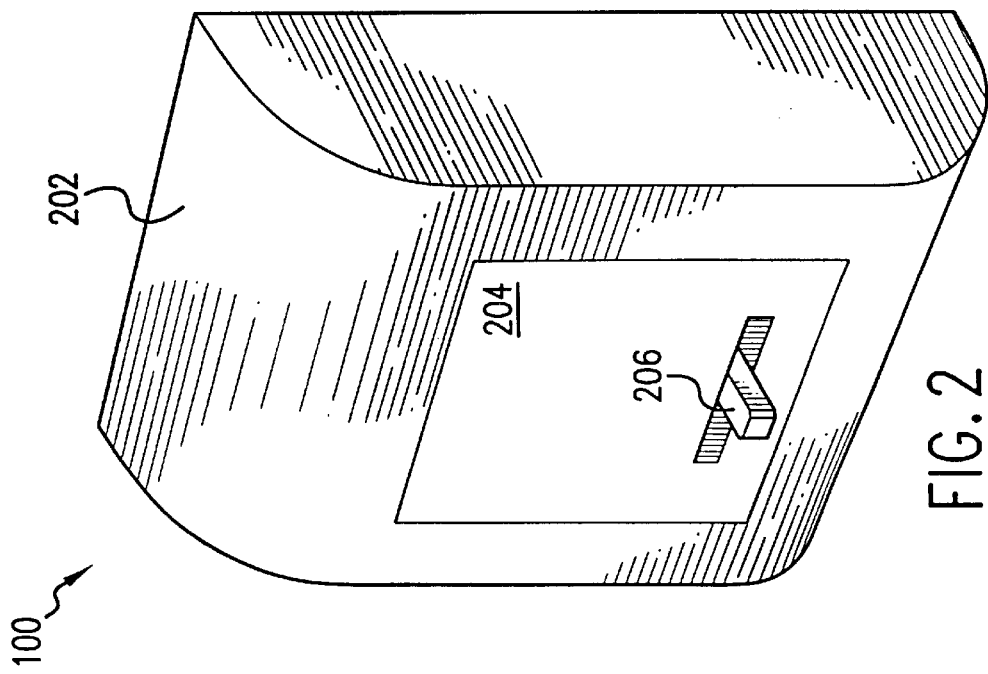
FIG. 2 is an isometric view of a supplementary lighting device of the present invention.
Figure 3B:
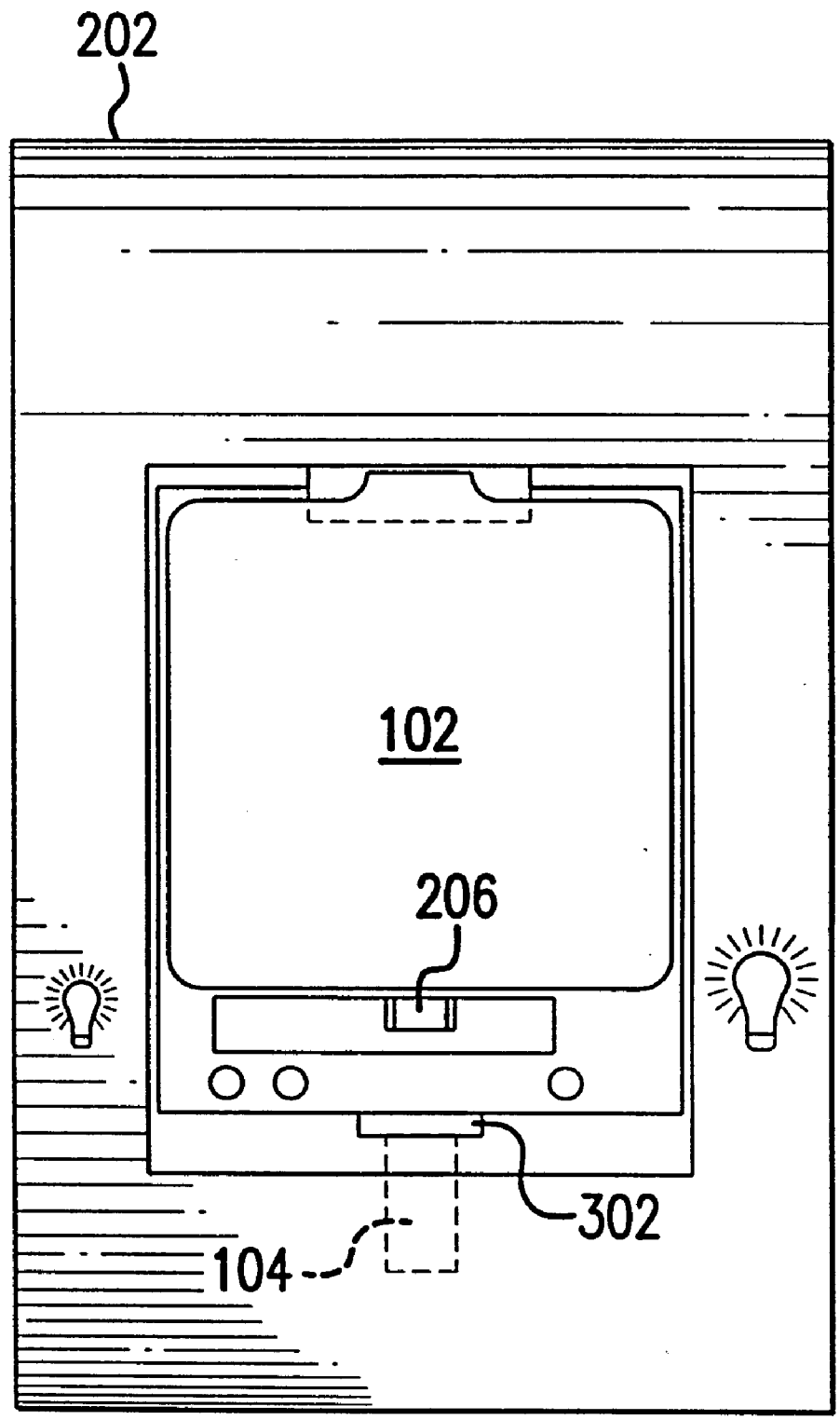
FIG. 3B is a front elevation view of a supplementary lighting device of the present invention with the window removed.

FIG. 2 shows a preferred embodiment of supplementary lighting device 100. Device 100 includes a housing 202, a window 204, and a dimmer control 206. Dimmer control 206 allows the user to vary the pre-set intensity of illumination element 102. Dimmer control 206 can allow user selection in a variety of ways, as will be more fully described below. FIG. 3A shows a front elevation view of device 100, showing housing 202, window 204, and dimmer control 206. Light sensor 104 is also shown in phantom. FIG. 3B shows a front elevation of device 100 with window 204 removed. It can be seen that illumination element 102 is located behind window 204. Light sensor 104 can also been seen in FIG. 3B. Further, aperture 302 is located near light sensor 104 to allow detection of ambient light 108.

A preferred embodiment of illumination element 102 is shown in FIG. 4. Illumination element 102 includes a substantially planar illumination area 402 and an elongated connection tail 404 extending from illumination area 402. Conductor strips 406 are disposed on connection tail 404. Conductor strips 406 connect to control system 106 to provide power to illumination element 102, as will be explained in more detail below.

FIG. 5 shows a side cross-section view of device 100, taken along line 5—5 of FIG. 3A. As can be seen, housing 202 and window 204 serve as an enclosure for device 100. Window 204 is preferably coupled to housing 202 by a fastener 502 located at a rear surface 504 of housing 202. Fastener 502 can be a screw or other similar type of fastening device. Window 204 may also be press fit into housing 202. However, a fastener is a preferred attachment device. In particular, it is preferable that the fastener be located at rear surface 504 of housing 202, because it requires removal of device 100 from the power source (wall socket) before window 204 can be removed. This safety precaution prevents one from attempting to replace illumination element 102 while device 100 is connected to the power source.

Window 204 preferably press fits illumination area 402 of illumination element 102 against a flat interior cavity 503 of housing 202. Elongated tail 404 of illumination element 102 fits into a guide-way 505. Guide-way 505 leads to connector 506 which connects to control system 106. When elongated tail 404 is inserted through guide-way 505 and into connector 506, conductor strips 406 make contact with connector 506, such that control system 106 provides power to illumination element 102. Guide-way 505 is the only path from the user-accessible area behind window 204 to control system 106.

Also shown in FIG. 5 is an additional safety feature to prevent minor electrical shocks or burns to small children attracted to supplementary lighting device 100 due to its proximity to the ground and attractive light. Device 100 is normally plugged into a common household wall socket via electrical contact blades 508 which protrude from rear surface 504 of housing 202. In a preferred embodiment of device 100, a recess or cavity 510 is formed in rear surface 504 of housing 202 surrounding electrical contact blades 508. A safety shield 512 is disposed in cavity 510 and extends the length of blades 508. Safety shield 512 is collapsible such that it collapses into cavity 510 as blades 508 are inserted into the wall socket. When blades 508 are removed from the wall socket, safety shield 512 extends from cavity 510 to prevent contact with blades 508 until device 100 is completely removed from the wall socket. Safety-shield 512 therefore prevents fingers, screwdrivers, toys, etc., from contacting blades 508 while blades are still in contact with the electrical power source. Safety-shield 512 is preferably made of non-conductive and resilient material such as rubber, and is preferably constructed in the form of bellows, as shown, for easy expansion and contraction.

Another embodiment of safety shield 508 is shown in FIGS. 12–18, installed in a transformer 1230, and shown as safety shield 1210. It is understood that such a safety shield can be installed in any plug-in electrical apparatus, such as a supplementary lighting device as described with respect to FIG. 5, or other similar devices. Safety shield assembly 1210 comprises specifically a bellows-like structure 1220, and a mating and co-operating recess 1222 in a face 1236 of an electrical apparatus, in this particular embodiment, a wall transformer 1230.

As discussed above, the present invention is applicable to any electrical apparatus which will plug directly into a wall receptacle. However, for ease of discussion, and because it is a practical usage for the safety shield assembly of the present invention, the following discussion is directed toward the embodiments shown where the safety shield assembly is used in association with wall-mounted transformer 1230. Typically, the input voltage to wall-mounted transformer 1230, across electrical blades 1232, is in the range of from 110 to 130 volts.

Typically, the output voltage on output lead 1234 is less than 25 volts—usually, 3 to 12 volts.

Wall transformer 1230 has a substantially planar face 1236 which surrounds the electrical blades 1232. Electrical blades 1232 extend outwardly from substantially planar face 1236.

Figure 16:
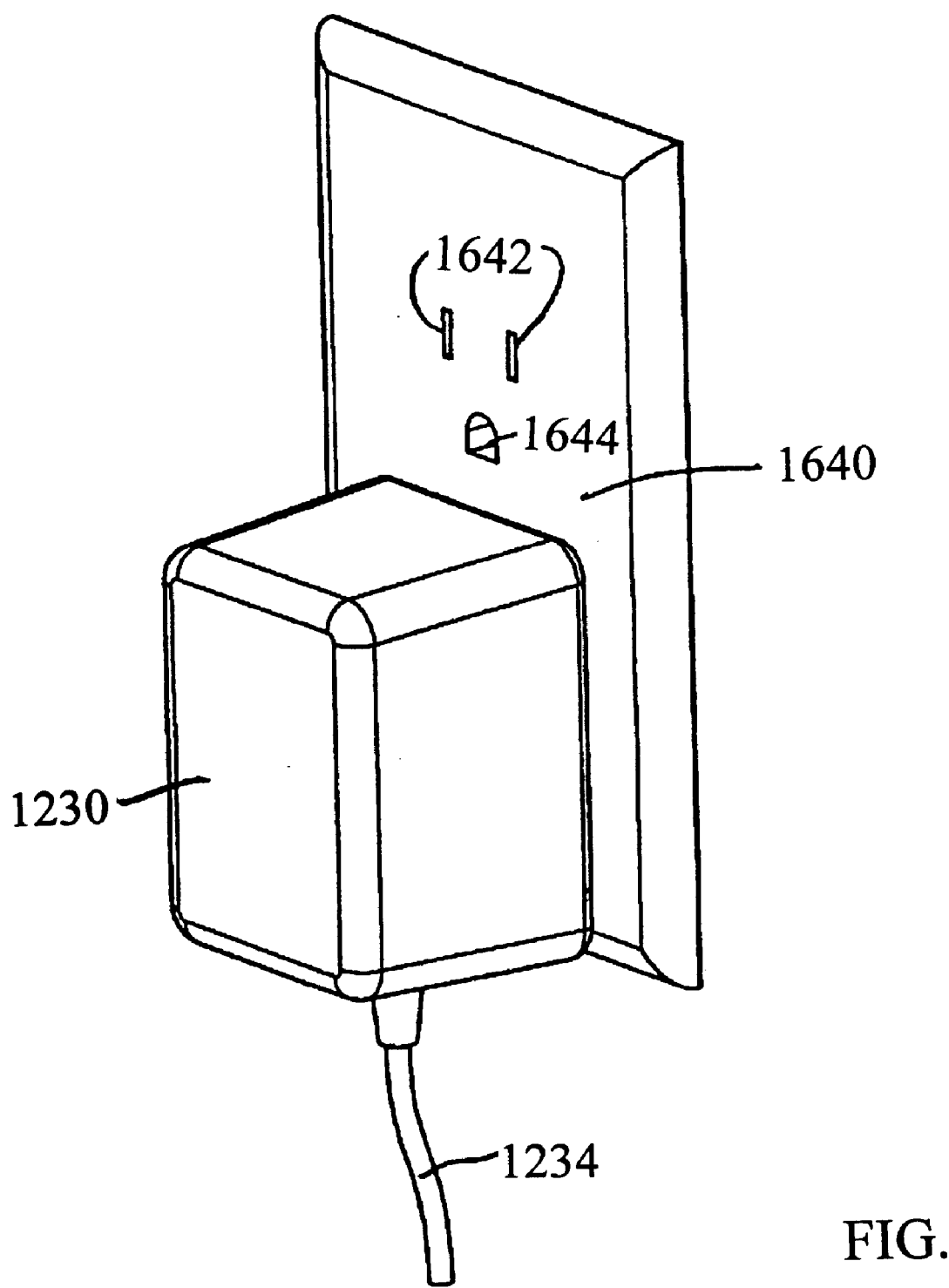
FIG. 16 shows the apparatus of FIG. 12 when it is mounted onto a wall receptacle.
Figure 17:
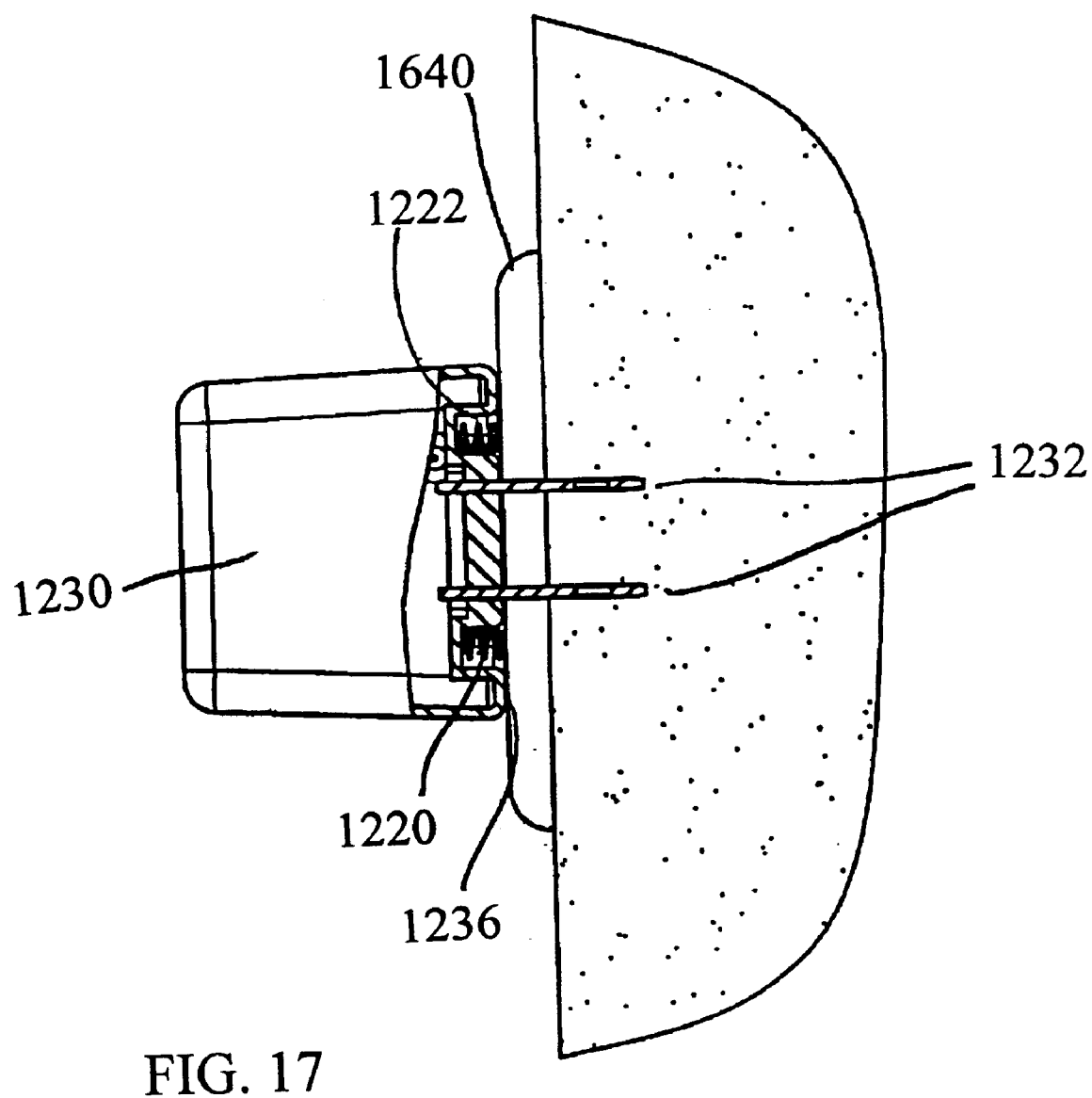
FIG. 17 is a partial cross-section view taken from above, of the mounted apparatus of FIG. 16.
Figure 18:
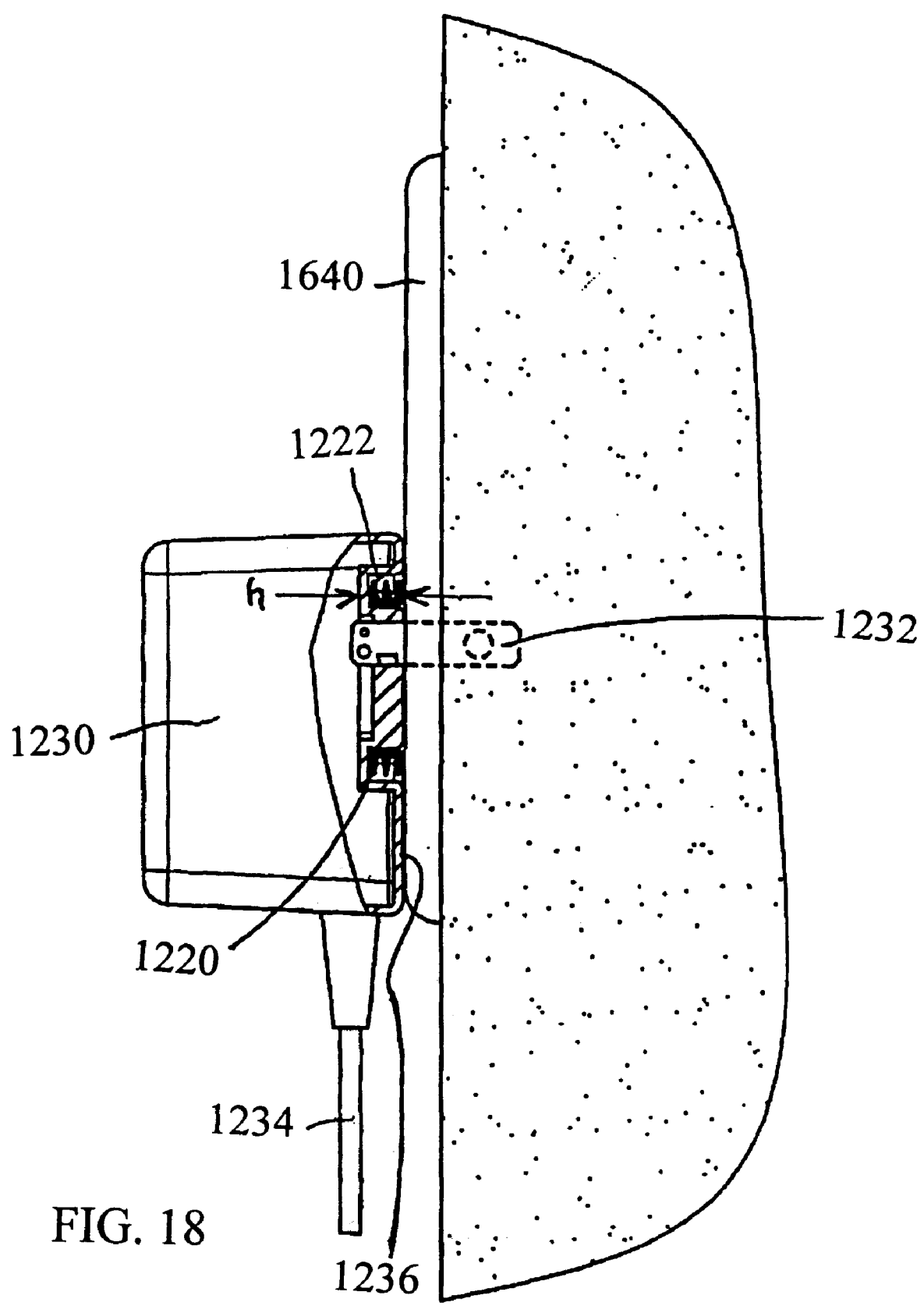
FIG. 18 is a partial cross-section, taken from the side, of the mounted apparatus of FIG. 16.

Wall transformer 1230 plugs into a wall receptacle 1640, in the manner shown in FIGS. 16 through 18. When transformer 1230 it is plugged in, the area of substantially planar face 1236 of transformer 1230 is sufficient to cover the region of the wall receptacle 1640 where the electrical sockets 1642, into which the electrical blades 1232 extend, are placed. That detail is not shown in FIGS. 17 and 18.

Therefore, the region of wall receptacle 1640 where the electrical sockets 1642 are placed is substantially planar, at least so as to be contiguous to substantially planar face 1236 of transformer 1230 when electrical blades 1232 are fully inserted into electrical sockets 1642, in the manner shown in FIGS. 16 through 18.

In order to provide the necessary protection again electrical shock, for which the safety shield assembly of the present invention is intended, the material of the bellows-like structure 1220 is electrically insulative.

Moreover, the material of bellows-like structure 1220 is compressible in a direction along the walls thereof, to a first compressed height "h", as noted in FIG. 18. This will be appreciated by examining any of FIGS. 12 through 14, and comparing them with either of FIGS. 17 or 18.

Figure 14:
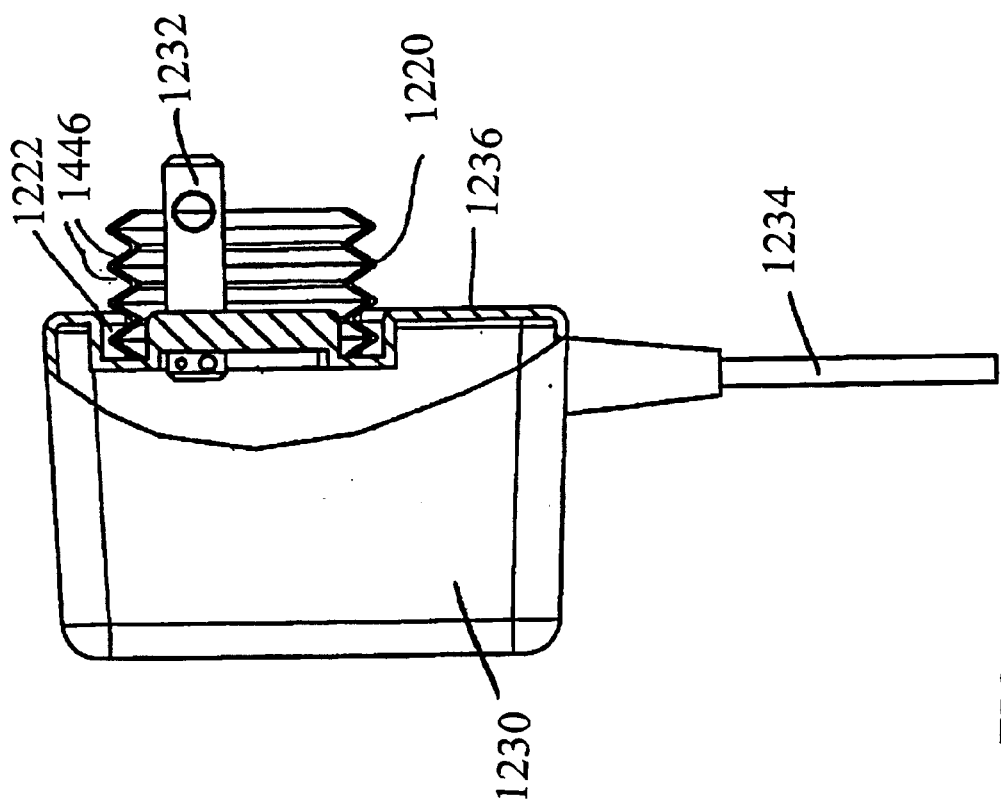
FIG. 14 is a view similar to FIG. 13, but partially in cross-section.

The material of bellows-like structure 1220, is such that in its uncompressed state, the outermost end of bellows-like structure 1220 extends beyond face 1236 to a height "H", as seen in FIG. 14. On the other hand, when bellows-like structure 1220 is compressed, then it is compressed to a height "h", as shown in FIG. 18, such that, in the preferred embodiment, it is flush with the plane of face 1236.

Figure 12:
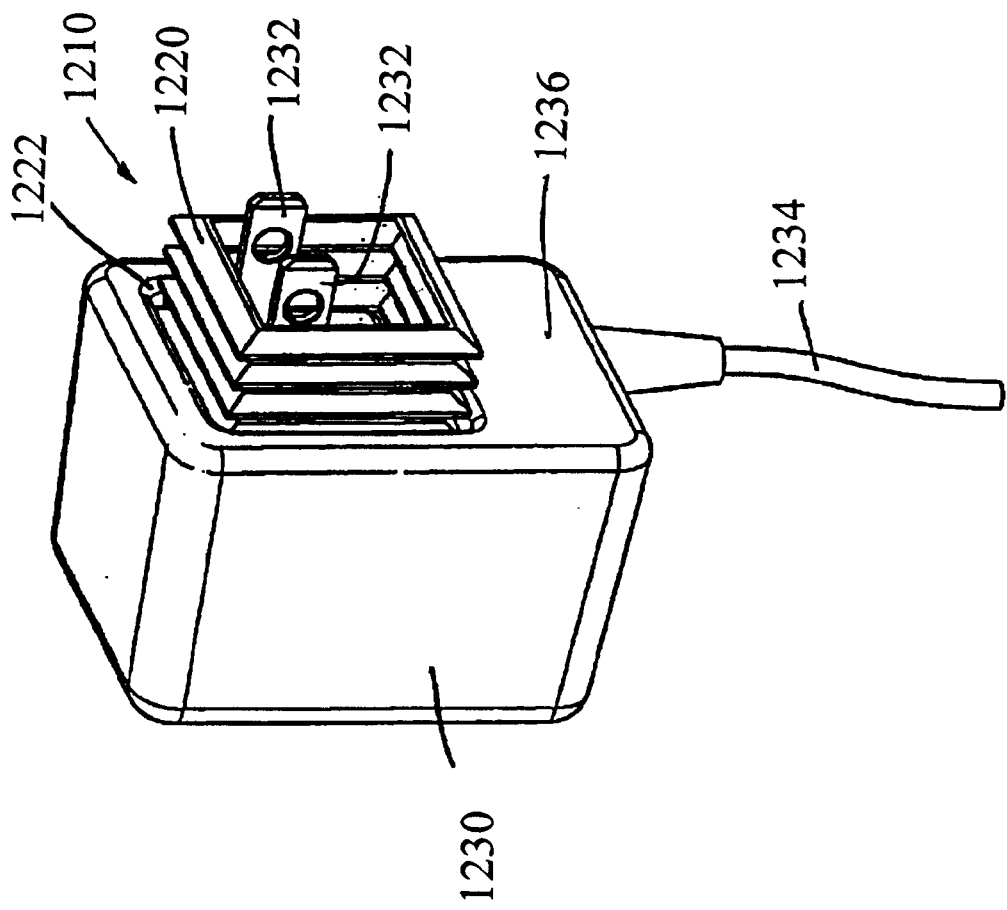
FIG. 12 is a perspective view of the safety shield assembly of the present invention, shown in association with a wall-mounted transformer structure.
Figure 13:
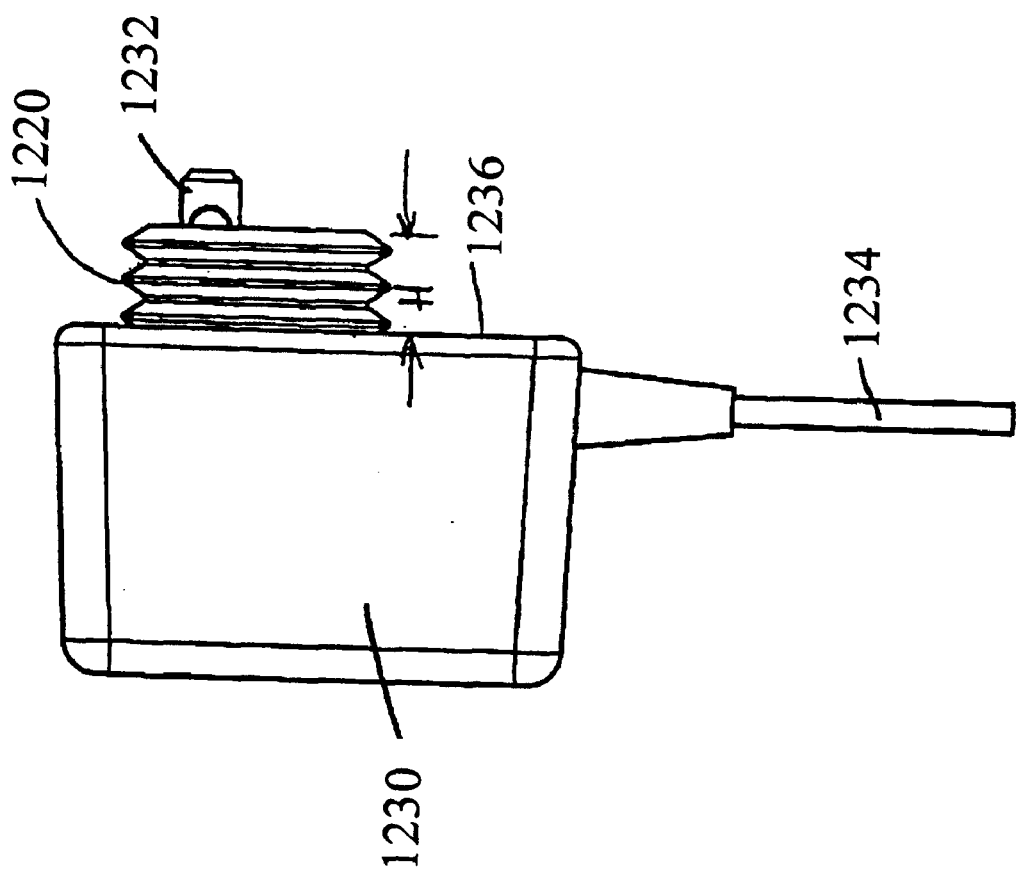
FIG. 13 is a side view of the structure of FIG. 12.
Figure 15:
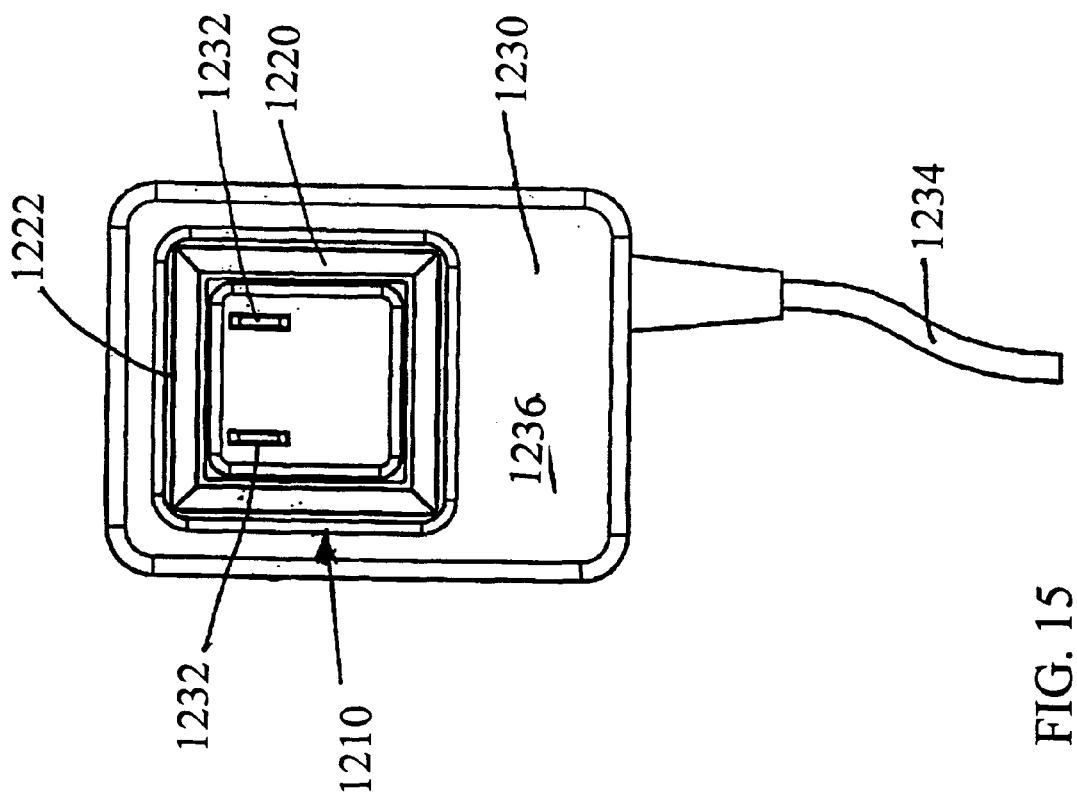
FIG. 15 is a view of the rear of the apparatus of FIG. 12.

As can be seen particularly in FIGS. 12 and 15, each of bellows-like structure 1220 and cavity 1222 is spaced away from and entirely surrounds the outwardly extending electrical blades 1232. It will also be seen in FIGS. 17 and 18, in particular, that the depth of cavity 1222 which is recessed into face 1236, is at least as great as the compressed height "h" of the bellows-like structure 1220. It will also be appreciated from any of FIGS. 12, 14, 15, 17, and/or 18, that the width of cavity 1222 is at least as great as the thickness of the walls of bellows-like structure 1220 from the outside to the inside thereof, when the bellows-like structure is in its compressed state as shown in FIGS. 17 and 18.

The inner end of the walls of bellows-like structure 1220 is secured in cavity 1222, so that bellows-like structure 1220 extends outwardly from groove 1222.

As noted, the height of the walls of bellows-like structure 1220 above substantially planar face 1236, when the bellows-like structure is in its uncompressed state, is shown at "H" in FIG. 14, and that height is such that from 50% up to at least 100% of the length of the shortest of the at least two electrical blades 1232 is covered.

There may be occasions when an electrical apparatus such as transformer 1230, also has a third, ground pin or blade, which is adapted to fit into mating socket 1644 (see FIG. 16). If so, then the ground pin is longer than either of electrical blades 1232; but it is the voltage between the electrical blades 1232 or between either of them and the ground pin when it is present, which will cause an electrical shock.

However, when electrical blades 1232 are withdrawn completely from the mating electrical sockets behind sockets 1642 as shown in FIG. 16, but not necessarily withdrawn from sockets 1642 which are in the outer cover plate for the wall receptacle, then there is no longer a risk of electrical shock as there is no longer a voltage imposed between electrical blades 1232.

A typical configuration for bellows-like structure 1220 and the cavity 1222 is rectangular, as illustrated in FIGS. 12 and 15, in particular. However, bellows-like structure 1220 and the cavity 1222 may also be circular in shape (as shown in FIG. 5, described above). As noted above, the typical shape is square—a specific form of a rectangle.

Because the bellows-like structure is configured as a bellows, the walls thereof are pleated as seen in any of FIGS. 12 through 14, 17, and 18.

Typically, the pleated walls of bellows-like structure 1220 will comprise from 2 to 6 pairs of folds 1446 (see FIG. 14); and atypical configuration is shown with one of four pairs of folds 1446 being received in cavity 1222, and three pairs of folds 1446 extending outwardly from cavity 1222. There may also be only three pairs of folds 1446, as suggested in each of FIGS. 17 and 18. As noted, a typical height "H" is such that structure 1220 covers from 70% to 85% of the length of the shortest one of the at least two electrical blades 1232. This permits some extension of the short blades—when there are three blades on the electrical apparatus—or of both blades on a typical two-blade apparatus as illustrated, beyond the outermost end of bellows-like structure 1220, so that an adult may more easily plug the electrical apparatus into a wall receptacle. However, as noted above, the mating electrical sockets where the blades electrically connect are recessed behind the openings therefor in the cover plate of a wall receptacle. Therefore, it is not necessary for bellows-like structure 1220 to cover 100% of the length of the shortest blade.

As has been noted above, instead of an electrical apparatus such as a transformer 1230 or supplementary lighting device 100, as shown, the present invention is applicable to any other device or electrical apparatus which plugs directly into a wall receptacle. Moreover, it is possible that electrical plugs can be configured so as to present a face 1236 into which a cavity 1222 might be recessed, and in which a bellows-like structure may be secured, to provide even additional caution and security against the risk of electrical shock—particularly by young children.

In any event, a safety shield assembly has been discussed and described, with specific details being provided by way of exemplification only.

Figure 6:
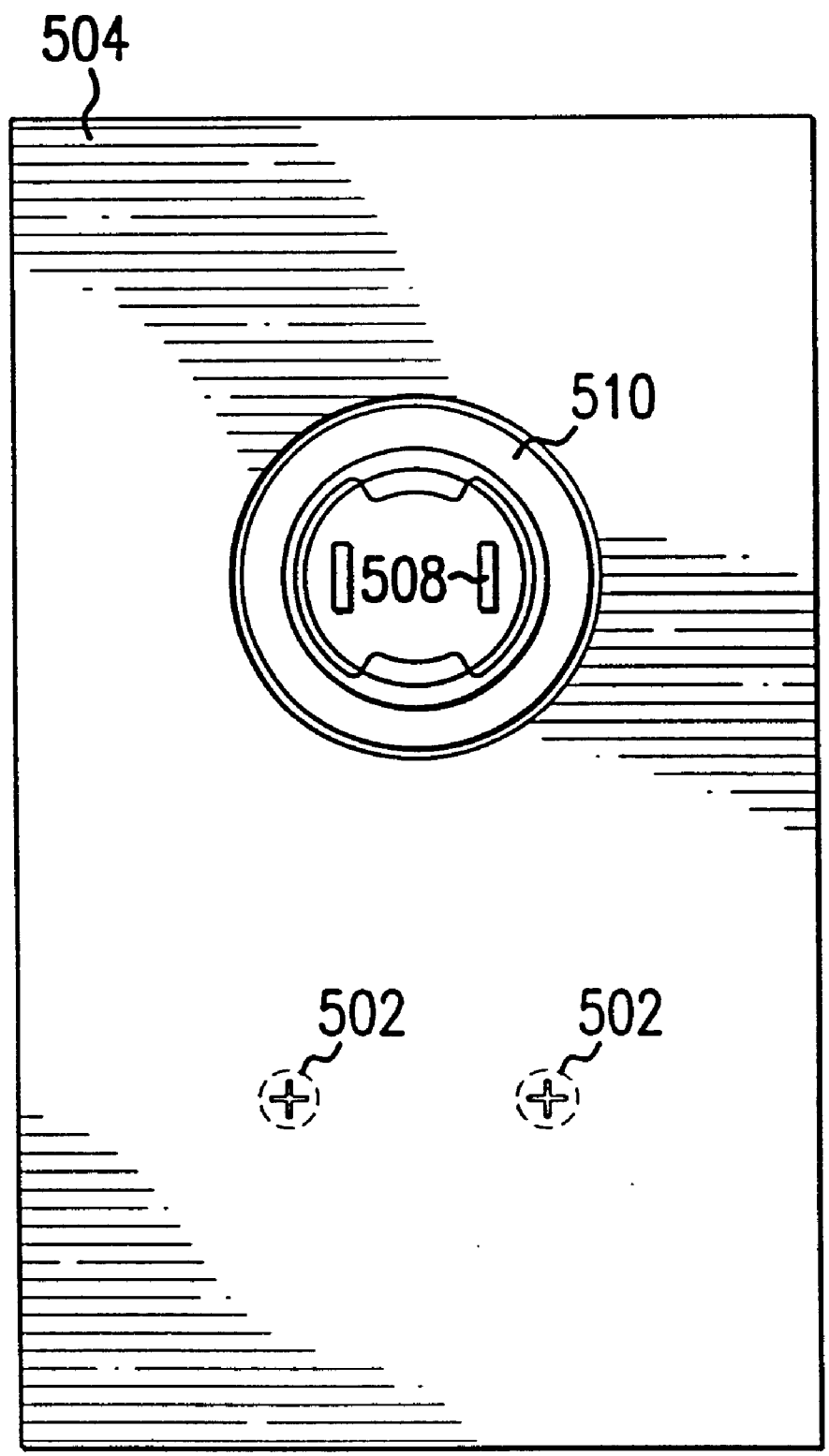
FIG. 6 is a rear elevation view of a supplementary lighting device of the present invention.
Figure 7:
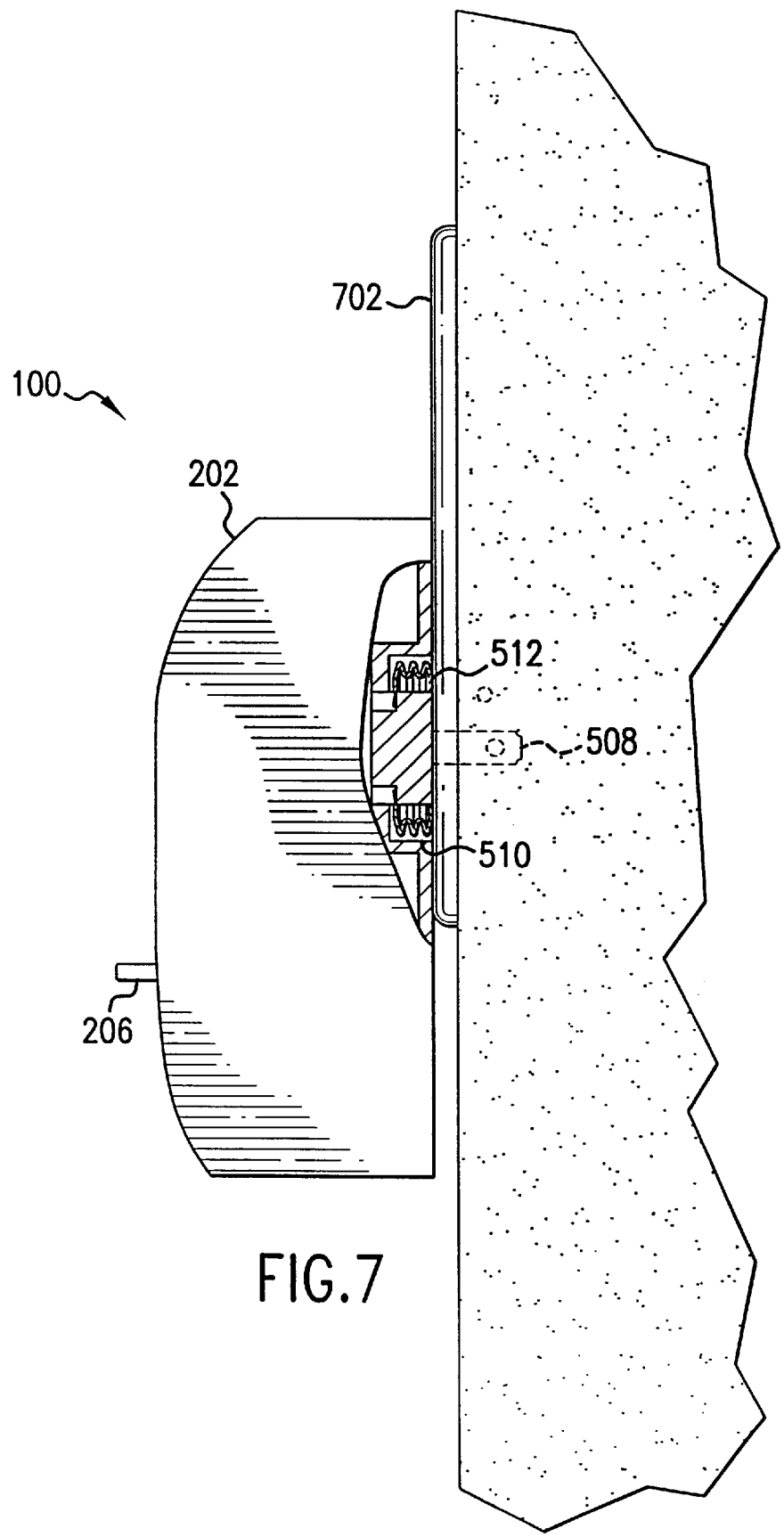
FIG. 7 is a side elevation of a supplementary lighting device of the present invention and a conventional wall socket.

FIG. 6 shows an elevation view of rear surface 504 of device 100, including cavity 510, electrical connection blades 508, and fasteners 502. FIG. 7 shows a side elevation of device 100 coupled to a standard household outlet 702 as a power source.

Explanation will now be provided for various embodiments of dimmer 110. Dimmer 110 can vary the illumination intensity of illumination element 102 by directly acting with control system 106, as shown in FIG. 1. Preferably, however, dimmer 110 works in conjunction with light sensor 104 to mechanically and/or optically adjust the intensity of light output from illumination element 102 which is detected by light sensor 104. As discussed above, the intensity of light outputted from illumination element 102 is increased or decreased by control system 106 depending on the amount of light detected from light sensor 104.

Therefore, dimmer 110 is constructed such that the amount of light detected by light sensor 104 can be artificially adjusted by the user.

One embodiment of a dimmer 110 is shown in FIGS. 8A and 8B. In this preferred embodiment, dimmer 110 comprises dimmer control 206 constructed as a small wheel which can be adjusted by the user. Light sensor 104 is disposed within wheel dimmer control 206 such that when dimmer control 206 is moved, light sensor 104 is angled towards or away from illumination element 102. When light sensor 104 is angled away from illumination element 102, as shown in FIG. 8B, it detects less light from illumination element 102, thereby causing control system 106 to increase power to illumination element 102, to make increase the intensity of illumination element 102 until the system regulates itself. Conversely, when dimmer control 206 is moved in the other direction, as shown in FIG. 8A, light sensor 104 is angled towards illumination element 102, thereby detecting more light from illumination element 102. Consequently, control system 106 reduces power to illumination element 102 which dims the output. It would be apparent to one skilled in the relevant art from this description that light sensor 104 also moves slightly closer to and away from illumination element 102 when dimmer control 206 is moved. This further increases or decreases the amount of light detected by light sensor 104. It can further be appreciated that if light sensor 104 is moved away from the center of dimmer control 206, turning dimmer control 206 towards or away from illumination element 102 has a greater effect on the distance that light sensor 104 moves towards or away from illumination element 102.

Figure 9C:
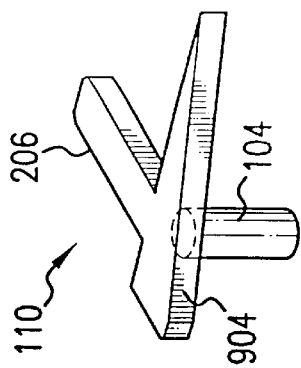
FIGS. 9A–9C are isometric views of an alternative embodiment of a dimmer of the present invention.
Figure 9B:
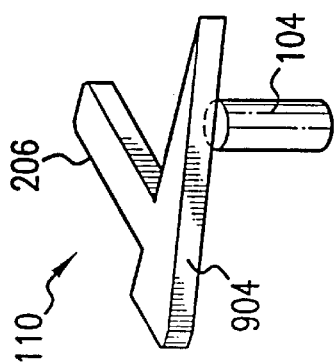
Figure 9A:
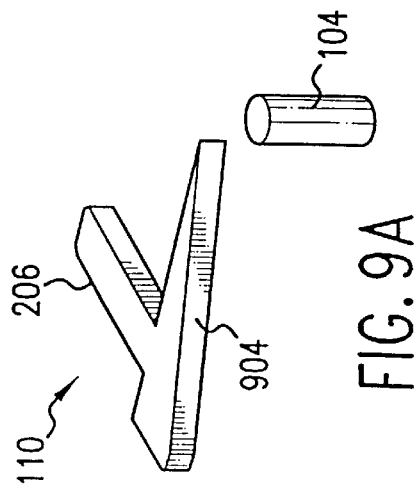

Another embodiment of dimmer 110 is shown in FIGS. 9A–9C. In this embodiment, dimmer 110 comprises dimmer control 206 and a mechanical dimmer element constructed as a sloped section 904. Dimmer control 206 allows the user to slide sloped section 904 such that light sensor is progressively unblocked (FIG. 9A), partially blocked (FIG. 9B), or completely blocked (FIG. 9C). The amount of sloped section 904 blocking light sensor 104 adjusts the quantity of light detected by light sensor 104. Therefore, if dimmer control 206 is moved such that sloped section 904 completely blocks light sensor 104, light sensor 104 detects no light from illumination element 102, thereby causing control system 106 to increase power to illumination element 102. Similarly, as dimmer control 206 is moved such that sloped section 904 begins to uncover light sensor 104, light sensor 104 detects more light from illumination element 102. This causes control system 106 to decrease power to illumination element 102, thereby decreasing the intensity of light emitted from illumination element 102.

Figure 10A:
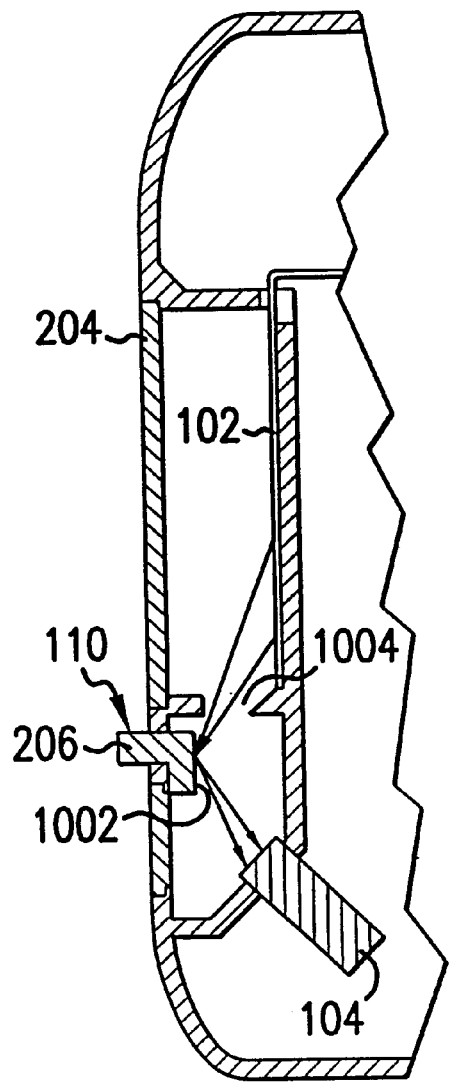
FIGS. 10A and 10B are a second alternative embodiment of a dimmer of the present invention.
Figure 10B:
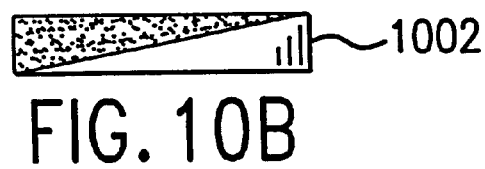

FIGS. 10A and 10B show another alternative embodiment of dimmer 110. In this embodiment, dimmer 110 comprise a dimmer control 206 and a partially mirrored reflective section 1002. Reflective section 1002 has a sloped reflective surface across its face. Dimmer control 206 allows the user to slide reflective section 1002 such that light emitted from illumination element 102 is variably reflected as a function of the amount of reflective material on the part of reflective section 1002 which is positioned so as to conduct light to light sensor 104 via aperture 1004. The sliding position of dimmer control 206 therefore adjusts the quantity of light detected by light sensor 104. As described above, if dimmer control 206 is moved such that reflective section 1002 reflects effectively no illumination from illumination element 102, light sensor 104 detects no light from illumination element 102, thereby causing control system 106 to increase power to illumination element 102. Similarly, as dimmer control 206 is moved such that reflective section 1002 reflects a greater amount of light from illumination element 102, light sensor 104 detects more light from illumination element 102. This causes control system 106 to decrease power to illumination element 102, thereby decreasing the intensity of light emitted from illumination element 102.

Several other possible embodiments of dimmer 110 exist. For example, dimmer control 206 could be coupled to illumination element 102 such that moving dimmer control 206 moves illumination element 102 towards or away from light sensor 104. This has the same effect as moving light sensor 104 towards or away from illumination element 102, as described above with respect to FIGS. 8A and 8B. Similarly, an adjustable reflecting device could be positioned between illumination source 102 and light sensor 104. Dimmer control 206 adjusts the angle or position of the reflecting device such that light sensor 104 detects more or less light from illumination element 102. Several other similar devices could be designed that increase or decrease the amount of light detected by light sensor 104 from illumination element 102.

Note that dimmer 110 can be designed to completely shut off light from illumination source 102 to light detector 104, as discussed above. This would allow maximum light output from illumination source 102, and also provides for the greatest amount of variability in output power (i.e., from 0% to 100%). It is also possible to design dimmer 110 such that it cannot completely prevent light from illumination source 102 from reaching light detector 104. In this embodiment, the system could not produce maximum output of the illumination source, however, it could provide automatic decay adjustment over a longer period of the illumination element's life span. For example, the system could be designed such that when dimmer 110 is adjusted for maximum output, control system 106 would only provide 30% of its maximum power supplying capability to illumination element 102. Although the maximum light output of such a system is initially less than if 100% of the power supplying capability were utilized, as illumination element 102 ages, the remaining 70% of control system's 106 power supplying capability would steadily come into effect. This would allow illumination element 102 to keep is artificial "maximum" output for a longer period of time.

Figure 11:
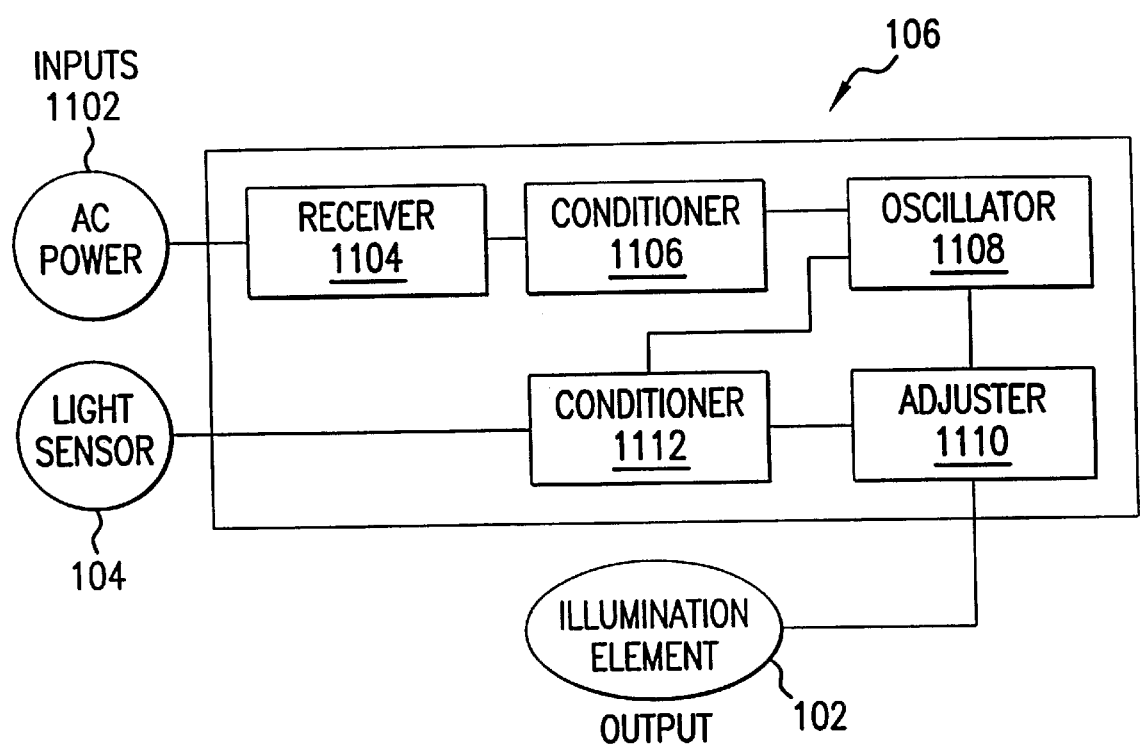
FIG. 11 is a block diagram of an embodiment of the control system of the present invention.

An exemplary embodiment of control system 106 is shown in block diagram form in FIG. 11. As would be apparent to one of ordinary skill in the relevant art, this is only a particular embodiment of control system 106. Several other designs could be utilized to achieve the same or similar result. Control system 106 receives input from AC power source 1102 and from light sensor 104. AC power is then treated through a rectifier 1104 and a power conditioner 1106. Rectifier 1104 can be a full wave rectifier, a half wave rectifier, a voltage doubler, or several other common design alternatives. Power conditioner 1106 can be comprised of capacitors, or resistors and capacitors, or inductors and capacitors, or various other common implementations. The purpose of power conditioner 1106 is to provide some amount of stabilization for the rectified power source. An oscillator 1108 receives the rectified and conditioned A/C power. Oscillator 1108 can generate a sinusoidal wave via an RC shift network, a Wien bridge, or an inductor-capacitor arrangement. Alternatively, oscillator 1108 can could generate a modified square wave or a composite wave-form via flip-flops, or an astable network, or via a free-running multi-vibrator, or via several other common circuit implementations, as would be apparent to one of ordinary skill in the relevant art. Oscillator 1108 could also use crystal or ceramic oscillators, or even the output of a microprocessor. Oscillator 1108 can be designed as either a fixed or variable-controlled oscillator. If the design is a variable-controlled oscillator, then the conditioned signal from light sensor 104 can vary the rate of oscillation as a function of the amount of light sensed, and thus it would affect the intensity of the EL element.

The output of the oscillator 1108 is then sent to a power adjuster 1110 which conditions the output so that it is within the operating norms of illumination element 102. The resulting power is then output from control system 106 and applied to the contacts of the EL lighting element, producing an appropriate glow. Power adjuster 1110 can be either a fixed- or variable controlled regulator design, configured so as to adjust either the voltage or the current (or both). If the design is a variable-controlled regulator, then the conditioned signal from light sensor 104 varies the amount of power output during each oscillation as a function of the amount of light sensed, and thus it would affect the intensity of illumination element 102.

The second input into control system 106 is from light sensor 104. The input from light sensor 104 is conditioned by conditioner 1112 to adjust it to the needs of the other circuitry in control system 106. The output from conditioner 1112 is then applied as a controlling signal for either oscillator 1108 or power adjuster 1110, or both. Thus, the signal from light sensor 104 affects the intensity of illumination element 102.

As the intensity of illumination element 102 varies, the changed intensity from illumination element 102 is detected by light sensor 104 transferred to control system 106, as described above. This allows for constant adjustment of the intensity of illumination element 102 to a desired setting, even when illumination element 102 begins to fade. As fading begins to occur, light sensor 104 will detect less light from illumination element 102, and power adjuster 1110 or oscillator 1108 of control system 106 will thereby increase the intensity of illumination element 102 until it reaches the intensity pre-set by the user using dimmer control 206. Similarly, as dimmer control 206 is adjusted, light sensor 104 detects less or more light from illumination element 102. Control system 106 automatically adjusts for this change, and power adjuster 1110 provides more or less power to illumination element 102. This allows for user control of the intensity of illumination element 102 simply by adjusting dimmer control 206.

In addition, when light sensor 104 is designed to detect ambient light 108 from the area surrounding device 100, an increase in ambient light 108 will cause control system 106 to decrease the intensity of illumination element 102. Therefore, control system 106 can be designed such that the amount of ambient light 108 detected by light sensor 104 will be sufficient to completely shut off illumination element 102 in daylight type conditions. This provides a "daytime off" feature which extends the serviceable life of illumination element 102. Similarly, light sensor 104 can be designed such that it receives both ambient light and light emitted from illumination element 102. Control system 106 can be designed such that the amount of ambient light 108 detected by light sensor 104 exceeds the amount of light detected from illumination element 102. Further, dimmer 110 can be designed to affect only that amount of light detected by light sensor 104 which is emitted by illumination element 102. This combination of design element allows the anti-ageing feature, the daytime-off feature, and the adjustable dimmer feature to be efficiently incorporated into a supplementary lighting device.

While the invention has been particularly shown and described with reference to preferred embodiments thereof, it will be understood by those skilled in the art that various changes in form and details may be made therein without departing from the spirit and scope of the invention.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element, but not necessarily precisely within the same plane.

What is claimed is:

1. A device comprising:
    a housing;
    electrical blades projecting from a surface of said housing; and
    an insulative structure surrounding said electrical blades, said structure retracting as said electrical blades are inserted into an electrical outlet and extending to surround said electrical blades as said electrical blades are removed from the electrical outlet.

2. The device of claim 1, further comprising a cavity formed in said surface of said housing, wherein said structure retracts into said cavity when said electrical blades are inserted into the electrical outlet.

3. The device of claim 1 or claim 2, wherein said structure comprises a bellows-like structure having convoluted and compressible walls.

4. The device of claim 3, wherein the material of said structure is selected from the group consisting of rubber, vinyl, polyvinylchloride, polyurethane, and mixtures, polymers, co-polymers, and derivatives thereof.

5. The device of claim 3, wherein the walls of said structure are pleated, and comprise from 2 to 6 pairs of folds.

6. The device of claim 3, wherein the uncompressed height of the walls of said bellows-like structure above said surface covers 50% to 100% of the length of the shortest of said electrical blades.

7. The device of claim 3, wherein the uncompressed height of the walls of said bellows-like structure above said surface covers 70% to 85% of the length of the shortest of said electrical blades.

8. The device of claim 2, wherein said structure and said cavity are each rectangular in shape.

9. The device of claim 2, wherein said structure and said cavity are each circular in shape.

10. The device of claim 1, wherein the device is a wall-mounted transformer for transforming household voltage to a low voltage below 25 volts.

11. The device of claim 1, wherein the device is a supplementary lighting device.

12. A safety shield assembly for an electrical apparatus which plugs directly into a wall receptacle, wherein the electrical apparatus has at least a pair of electrical blades for insertion into a pair of mating electrical sockets and wherein the electrical apparatus has a substantially planar face surrounding said electrical blades, from which said substantially planar face said electrical blades extend outwardly, said safety shield assembly comprising:
    an electrically insulative structure which is compressible and expandable, wherein said structure retracts as the electrical blades are inserted into the electrical sockets and said structure extends to surround the electrical blades as the electrical blades are removed from the electrical sockets.

13. A safety shield apparatus according to claim 12, further comprising a cavity recessed into the substantially planar face of the electrical apparatus, wherein an end of said electrically insulative structure is secured in said cavity and extends therefrom.

14. A safety shield apparatus according to claim 13, wherein said electrically insulative structure is a bellows-like structure compressible in a direction along the walls thereof to a first, compressed height and wherein said cavity has a depth at least as great as said first compressed height of said bellows-like structure, and a width at least as great as the thickness of the walls of said bellows-like structure from the outside to the inside thereof, when said bellows-like structure is in its compressed state.

15. A safety shield apparatus according to claim 14, wherein said structure is expandable to a second, expanded height above the substantially planar face of the electrical apparatus, said expanded height being such that from 50% to 100% of the length of the shortest of the electrical blades is covered by said structure.

16. The safety shield assembly of claim 15, wherein said expanded height covers 70% to 85% of the length of the shortest of the electrical blades.

17. The safety shield assembly of claim 14, wherein the walls of said bellows-like structure are pleated, and comprise from 2 to 6 pairs of folds.

18. The safety shield assembly of claim 13, wherein said structure and said cavity are circular in shape.

19. The safety shield assembly of claim 13, wherein said structure and said cavity are each rectangular in shape.

20. The safety shield assembly of claim 12, wherein the material of said structure is chosen from the group consisting of rubber, vinyl, polyvinylchloride, polyurethane, and mixtures, polymers, co-polymers, and derivatives thereof.

21. The safety shield assembly of claim 12, wherein the electrical apparatus is a wall-mounted transformer for transforming household voltage to a low voltage below 25 volts.

22. The safety shield assembly of claim 12, wherein the electrical apparatus is a supplementary lighting device.

23. The safety shield apparatus of claim 12, wherein the electrical apparatus is a room air-freshener.

* * * * *